United States Patent [19]

Balaz et al.

[11] B 4,055,681

[45] Oct. 25, 1977

[54] METHOD OF MAKING A DRY-TYPE PET FOOD

[75] Inventors: Alexander Balaz, Barrington; David P. Bone, Palatine; Edward L. Shannon, Barrington, all of Ill.

[73] Assignee: The Quaker Oats Company, Chicago, Ill.

[21] Appl. No.: 478,759

[22] Filed: June 12, 1974

[44] Published under the second Trial Voluntary Protest Program on March 16, 1976 as document No. B 478,759.

[51] Int. Cl.² .......................... A23J 3/00; A23K 1/14

[52] U.S. Cl. .................................. 426/656; 426/657; 426/805

[58] Field of Search ............... 426/356, 359, 362, 656, 426/657, 805, 364

[56] References Cited

U.S. PATENT DOCUMENTS

| | | | |
|---|---|---|---|
| 3,202,514 | 8/1965 | Burgess et al | 426/805 XR |
| 3,684,522 | 8/1972 | Anker et al. | 426/364 X |
| 3,759,715 | 9/1973 | Loepiktie et al. | 426/364 X |
| 3,814,823 | 6/1974 | Yang et al. | 426/362 |
| 3,883,672 | 5/1975 | Bone et al | 426/656 |

*Primary Examiner*—James R. Hoffman
*Attorney, Agent, or Firm*—Mathew R. P. Perrone, Jr.; Richard H. Shear

[57] ABSTRACT

A method is described for producing a dry pet food having a moisture content of less than 15 percent by weight. Its texture may be substantially solid and fibrous or it may be expanded. The pet food contains a reduced amount of amylaceous ingredients as well as specified types of proteinaceous adhesives in conjunction with plasticizing agents, and is processed to form either a fibrous or an expanded texture using a specially designed air nozzle.

37 Claims, 4 Drawing Figures

METHOD OF MAKING A DRY-TYPE PET FOOD

BACKGROUND OF THE INVENTION

1. Field of the Invention

This invention relates to a dry, meaty pet food that is soft, elastic, and meat-like in texture. The pet food can be processed so that either a solid, fibrous product or an expanded product having a plurality of voids is obtained.

2. Description of the Prior Art

Conventional dry type pet foods are characterized as having a moisture content of 15 percent by weight or less. When distributed in the normal marketing system they are characterized as having hard, brittle structures and as a consequence relatively small particle size and only a nominal resemblance to meat. A conventional dry pet food typically has the following formulation:

| | Percent by Weight |
|---|---|
| Amylaceous ingredients | 24–50 |
| Animal protein source | 5–25 |
| Vegetable protein source | 10–30 |
| Fat source | 5–15 |
| Supplements (vitamins, minerals, flavoring, etc.) | 1–5 |
| Water | 5–15 |

Due to the hard, brittle nature of these dry pet foods, it is often necessary to moisten them with water or mix them with moist foods in order to increase their palatability to a sufficient degree to obtain consumption. Furthermore, as shown by the above formulation, conventional dry pet foods often contain amylaceous ingredients including cereal grains at levels as high as 50 percent. The amylaceous content at any level, and especially at a high level of amylaceous ingredients is a stigma against a meat image that pet food manufacturers attempt to convey to customers of dry type pet foods. For these reasons there is a need for a dry type pet food which has a meat-like texture and appearance, and little or no amylaceous ingredients.

SUMMARY OF THE INVENTION

It is, therefore, an object of this invention to provide a method of producing a pet food having a soft, elastic, substantially meat-like texture and appearance that is retained during normal storage, i.e., up to 24 months.

Yet another object of this invention is to provide a processed pet food which ranks high in palatability and acceptability to animals.

A further object of this invention is to provide a processed pet food having a moisture content of less than 15 percent and having either a substantially fibrous solid texture that is soft, elastic and meat-like in appearance or an expanded texture that is soft, elastic, and meat-like in appearance.

These and other objects of this invention are accomplished by mixing conventional dry pet food ingredients along with specific proteinaceous adhesives and plasticizing agents while limiting the use of amylaceous ingredients to 25 percent by weight or less and further processing the mixture to yield semi-moist like yet dry pet food resembling meat in both texture and appearance. The pet food thus produced will be capable of being stored as a dry pet food, yet will not need additional moisture to increase its palatability.

BRIEF DESCRIPTION OF THE DRAWING

This invention may be more fully described but is not limited by the enclosed drawings wherein.

DETAILED DESCRIPTION OF THE INVENTION

Figure 1:
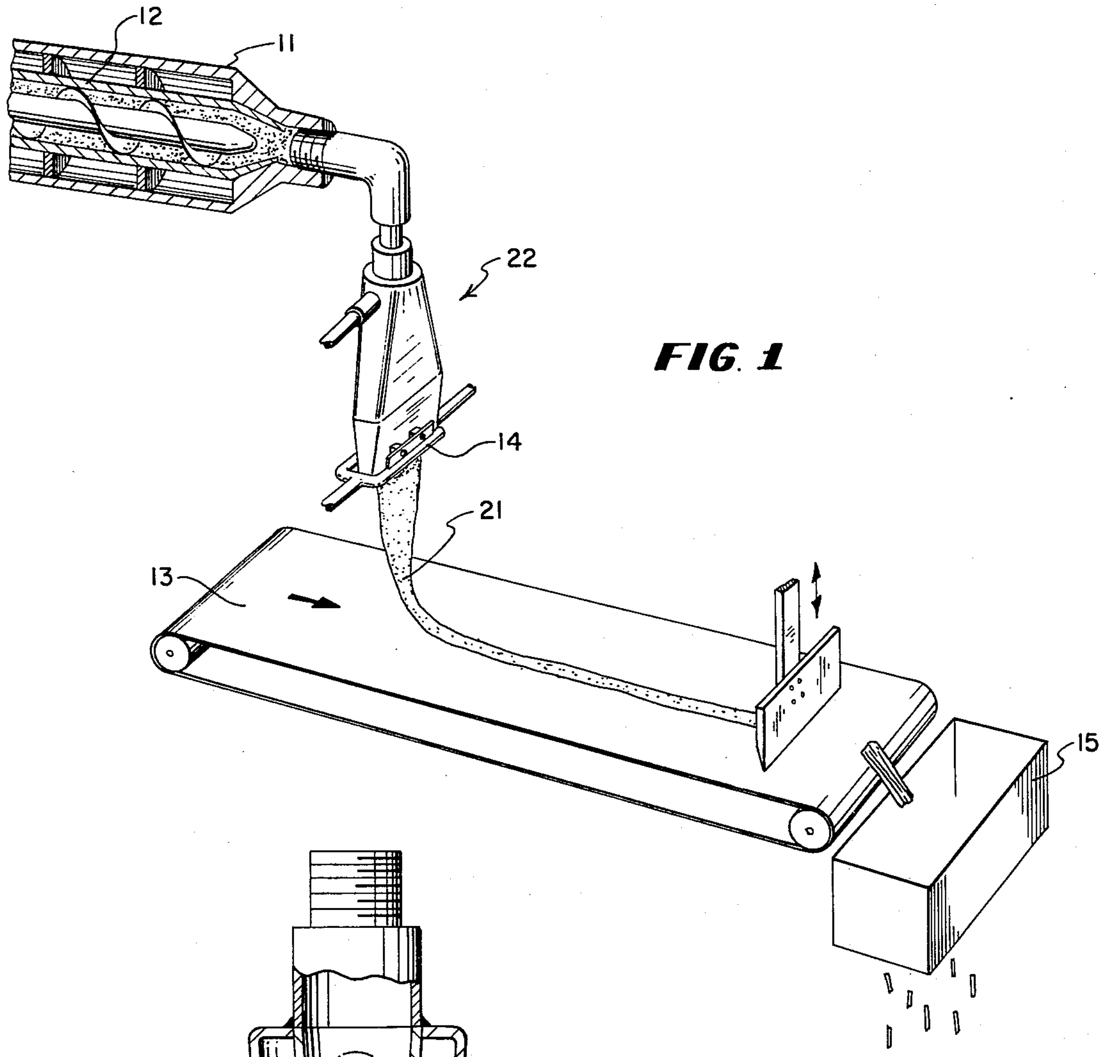
FIG. 1 illustrates a perspective view of an apparatus used to carry out the process of this invention in which a fibrous product is obtained.

In copending application by Bone et al., our U.S. patent application Ser. No. 478,761, filed along with the present application, a dry pet food having a substantially unexpanded or solid texture that is soft, elastic, and meat-like in appearance is disclosed. The present invention relates to a process for producing a dry pet food having a similar composition as that pet food yet having a substantially fibrous stringy texture or having a substantially expanded texture according to differences in processing.

By "dry pet food" is meant one that has a moisture content less than 15 percent by weight, and typically about 10 percent. Hereinafter all percentages referred to are understood to be by weight unless specified otherwise, and are based upon the weight of the final product. As disclosed in Bone et al. U.S. patent application Ser. No. 478,761, these foods are composed of amylaceous ingredients such as cereal grains, flours, or starch, fats, sugar, a proteinaceous adhesive, and a plasticizing agent. Additional protein source ingredients to provide protein other than that obtained from the proteinaceous adhesive may be employed in order to satisfy legal and nutritional requirements for protein quantity and quality. While the quantity of protein source, fat, and sugar, is considered to be within the skill of the art, a typical quantitative range of these ingredients includes from about 0 to about 35 percent protein source ingredient, from about 3 to about 15 percent fat, and from 0 to about 35 percent sugar.

Vitamin, mineral, color, flavor and other known supplements may be used as well to enhance the pet food properties. Among these are choline chloride, MgO, Vitamin A, $B_{12}$, $D_3$, and E,riboflavin, niacin, folic acid, pyridoxine HCl; thiamine mononitrate, Ca pantothenate as vitamin and mineral supplements. Such supplements are commonly used up to about 5 percent of the final product.

By "protein source" is meant additional protein other than that obtained from the required proteinaceous adhesive. Typical protein source ingredients are those normally containing 20 percent or more protein by weight. Examples of protein source ingredients are soybean oil meal, soybean flour, soy protein concentrate, soy protein isolates, meat meal, meat and bone meal, fish meal, blood meal, dried blood plasma, yeast, milk proteins, dried skim milk, cottonseed meal, cottonseed flour, cottonseed protein isolate, peanut meal, peanut flour, peanut protein isolate, corn germ, corn germ meal, wheat germ, wheat germ meal, corn gluten feed, corn gluten meal, corn distiller's dried grains, dried corn distiller's solubles, dried meat solubles, poultry by-product meal, and any other edible proteinaceous foodstuff including animal protein.

Fresh meat and meat by-products may also be employed and are particularly useful in imparting palatability. The term "meat" is understood to apply to the flesh of cattle, swine, sheep, goats, horses, whale, and other mammals, poultry, and fish. The term "meat by-products" includes such substituents as are embraced by that term in the *Definition of Feed Ingredients* published by the Association of American Feed Control Officials, Inc.

By the term "sugar" is meant any known sugar utilized in the food art.

Briefly stated, the novel aspects of the present invention involve incorporating into the dry pet food one or more proteinaceous adhesives in combination with one or more compatible plasticizing agents and processing in a manner to yield products that are substantially soft, elastic, cohesive, that do not stale, and which are substantially meat-like in form and appearance.

The invention further contemplates using proteinaceous adhesives in a range of from about 4 to about 60 percent of the final product. Either one or a combination of the following proteinaceous adhesives may be utilized to form the 4 to 60 percent, however, modified oil seed vegetable proteins, such as alkali modified soy protein isolate, alkali modified soy protein concentrates, or alkali modified soy flour are preferred. Also, alkali modified wheat gluten is preferred. Economically, alkali modified soy flour would be most preferred.

Proteinaceous adhesives are of two general classes, natural and modified. Examples of natural proteinaceous adhesives are collagen, albumens such as blood albumen or egg albumen, casein, and the simple salts or proteinates of natural proteinaceous adhesives such as sodium caseinate, potassium caseinate, calcium caseinate, magnesium caseinate, and ammonium caseinate. Examples of proteinaceous adhesives derived by modification of natural proteins are alkali modified wheat gluten, or alkali modified oil seed vegetable proteins such as alkali modified soy protein, alkali modified soy protein isolates, alkali modified soy proteinates, alkali modified soy flour, alkali modified soy concentrates, alkali modified cottonseed flours, concentrates and isolates, alkali modified peanut flours, concentrates, and isolates, and other modified proteins such as yeast, modified yeast protein isolates, modified blood and modified blood proteins, modified albumin, modified keratins, and any other food proteins that modified or unmodified provide a source of proteinaceous adhesive material.

The term "modified" protein and "alkali modified" protein is used interchangeably herein. By modified or alkali modified protein is meant one that is subjected to an alkaline hydrolysis such as the alkaline hydrolysis of an oil seed vegetable protein disclosed in U.S. patent application Ser. No. 478,751 By Kumar et al. filed June 12, 1974 by Kumar et al., which is hereby incorporated by reference. Generally, this modification proceeds by forming an aqueous slurry of a protein material containing at least 50 percent protein. The pH of the slurry is then adjusted to a pH of from 7.0 to 10.5 by adding to the aqueous slurry an alkali metal carbonate. A pH of about 8 is preferable. The slurry is then heated to react the protein with the alkali metal carbonate. The reaction temperature required ranges from 295° to 310°F. The slurry is then neutralized to a pH of from 6.6 to 7.0 by the addition of an edible acid. The slurry is then dried to remove most of the water and yield the alkali modified protein. If desired, the protein may be subjected to a fermentation with a yeast before forming the aqueous slurry. The slurry may be added directly to the mixture as an ingredient or it may be dried to remove most of the water prior to use.

Plasticizing agents utilized within the scope of the invention includes glycerol, sorbitol, 1,3-butanediol, mannitol, propylene glycol, and other equivalent plasticizers suitable for food use. These may include glycerine, mono-glycerides of fatty acids, corn molasses, sugar or corn syrups between 20 to 50 dextrose equivalents, fats, and oils. Especially useful are corn molasses, sugar syrups, and corn syrups. The quantitative range of plasticizing agent utilized in the present invention ranges from about 2 to about 40 percent of the final product. While the plasticizing agents listed or a combination of those listed may be used, it is preferable that from 2–15 percent of the final product consist of sorbitol.

It is within the scope of the present invention to include amylaceous ingredients as part of the final product. As much as 25 percent may be utilized. However, it is preferable that the amount of amylaceous ingredients be minimized or even eliminated in order to enhance and maintain the meat-like texture, even upon storage. A greater amount of amylaceous ingredients will yield a product less resembling meat in texture, especially during storage.

By "amylaceous ingredients" is meant those foodstuffs containing a preponderance of starch and/or starch-like material. Examples of amylaceous ingredients are cereal grains and meals or flours obtained upon grinding cereal grains such as corn, oats, wheat, milo, barley, rice, and the various milling by-products of these cereal grains such as wheat feed flour, wheat middlings, wheat mixed feed, wheat shorts, wheat red dog, oat groats, hominy feed, and any other such material. Also included as sources of amylaceous ingredients are the tuberous foodstuffs such as potatoes, tapicoa, or the like.

Other examples of amylaceous ingredients are the various edible grain or tuberous starches and modified starches.

By the term "modified starch" we mean the use of thin-boiling (acid or oxidized treatment) or thick-boiling regular grain or tuberous starch, high amylose corn starch or waxy starch, or combinations thereof, either pregelatinized before, after, or distinct from the treatment with cross-linking agents such as sodium trimetaphosphate or phosphorus oxychloride alone or in conjunction with alkylating agents such as propylene oxide, or acetylating agents such as acetic anhydrides.

The invention contemplates the use of sugar because of its carbohydrate value as well as its adequacy as a plasticizer and a filler. As much sugar as 35 percent by weight of the final product may be utilized, however, it may be eliminated entirely and replaced by using a greater amount of the other ingredients.

Generally, the dry pet food of this invention having a meat-like texture and appearance can be produced by forming a dough by blending a mixture of a protein source, fat, sugar, proteinaceous adhesive, plasticizing agent, and sufficient water to provide a final product that when cooked contains less than 15 percent moisture, and an additional amount of water required for processing. It is to be understood that the determination of the amount of ingredient water required includes that water obtained from the other ingredients. For instance, if the other ingredients yield a water content of 3 percent and a final product having a 10 percent moisture content is desired, then 7 percent water in addition to that required for processing must be added. The dough is then cooked at a temperature of from about 200° to about 300°F., said cooking process causing the development of an adhesive, elastic matrix of said proteinaceous adhesive in conjunction with said plasticizing agent. The cooked mixture is then cooled and subdivided into pieces. While the temperature range of from about 200° to about 300°F. is sufficient to develop said meat-like texture and appearance upon cooking said mixture, the specific or preferred range is from about 235° to about 270°F. The amount of water required for processing said mixture is usually the equivalent of from about 5 parts per hundred to about 15 parts per hundred by weight of the final product. When the process water used is less than the equivalent of 5 parts per hundred parts by weight of the product, it may be necessary to increase said cooking temperature above about 270°F., and when amounts of said process water greater than the quivalent of 15 parts per hundred are used it may be necessary to employ cooking temperatures less than about 235°F. Furthermore, if the cooked product contains more than 15 percent moisture, it may be necessary to include a drying step with the steps of cooling and subdividing in order to reduce the moisture content of the final product to less than 15 percent.

By water required for processing, or process water, as used herein is meant that amount of water over and above the amount of ingredient water required in the formulation of the final product. Process water is utilized to process the dough so that a pet food may be produced.

A product having fibrous texture and appearance is produced by allowing said cooked dough to stretch and immediately cooling said stretched cooked mixture below the said temperature range employed commensurate with the level of said process water employed. The stretching of the hot mixture forms the fibrous-like structure, while the immediate cooling prevents the fibers from coalescing back into a solid or non-fibrous form. It has been found that the cooked mixture may tear upon stretching, thereby eliminating the need for subdividing.

A product having an expanded texture and appearance is produced by cooking said dough within a heat exchanger, for example, such as a heated continuous extruder. The cooked extrudate is discharged from the extruder in a substantially continuous manner through a discharge die fitted with a nozzle to admit and impinge the hot extrudate with a continuous stream of air or other appropriate gas injected at a rate and pressure commensurate with the rate of extrusion and degree of expansion desired. Such parameters can be determined by visual inspection and are within the purview of one skilled in the art. Any gas not capable of reaction with the hot extrudate is suitable. Air being the most economical is preferred.

FIG. 1 represents a schematic illustration of the process of the invention whereby a dry meat-like pet food having a substantially fibrous texture and appearance is produced. The blended ingredients are introduced into a screw extruder 11 having a heated jacket 12. The ingredients are conveyed and cooked in the extruder and discharged onto a conveyor belt 13. After being discharged from the extruder die 22 which is spaced sufficiently above the conveyor so that the extrudate is allowed to stretch by gravitational forces acting on the extrudate's own weight, it is immediately cooled. If the hot extrudate is allowed to stretch from 1 to about 10 percent of its original length and then cooled the result will be a product having a fibrous surface with a solid core. A stretching of from about 10 to 30 percent of its original length will yield a fibrous structure throughout the extrudate. Immediate cooling of the extrudate below the temperature range employed commensurate with the level of said process water is critical. Otherwise the hot fibers will coalesce forming a solid mass. The fibers are then discharged onto conveyor belt 13.

If desired a water cooled conveyor system may be utilized. The cooked extrudate may then be further cooled while on the conveyor by conventional means, and passed through a dicing machine 15 whereby the cooked extrudate is cut into bite size pieces and packaged. After dicing, but prior to packaging, it may be beneficial to further cool the product utilizing conventional means. Any suitable dicing machine may be used for this function, but one illustration of such a machine is one found in U.S. Pat. No. 2,690,011.

Figure 2:
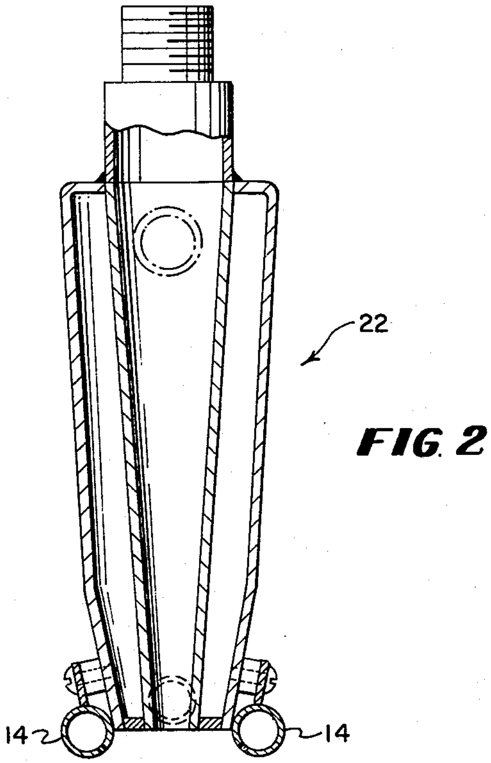
FIG. 2 illustrates an extruder die air nozzle combination utilized in the formation of fibers from the extrudate.

If desired, the cooked extrudate may be cooled by use of a discharge die fitted with a means whereby air is directed onto the extrudate in a continuous manner. FIG. 2 illustrates such an extruder die. At the end of the die is a cooling means 14 affixed thereon. As the hot extrudate exits from die 22 its own weight causes it to stretch and form a fibrous like texture. Before the fibers have time to coalesce they are cooled by blasting at the extrudate from the side, ambient temperature air from a pressurized air source connected to cooling means 14. If the pressure of the blasts of air are great enough, further fiber formation may result.

Figure 3:
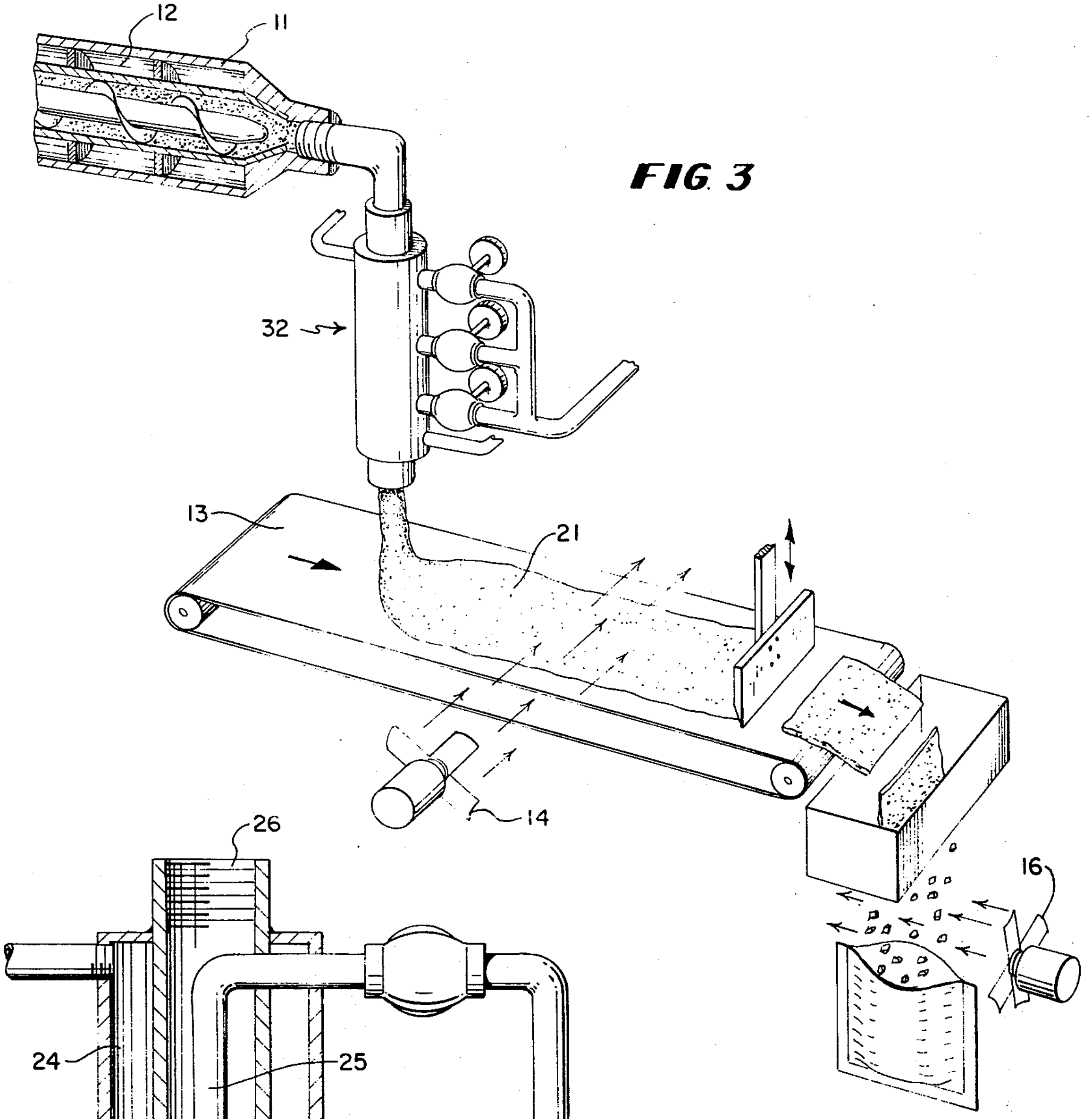
FIG. 3 illustrates a perspective view of an apparatus used to carry out the process of this invention in which an expanded product is obtained.
Figure 4:
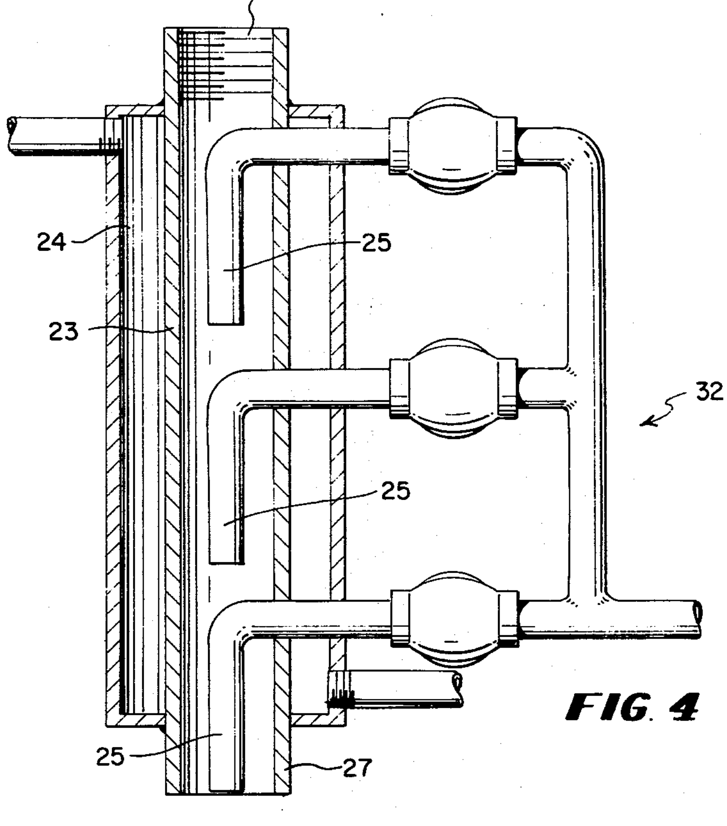
FIG. 4 illustrates an extruder die having an inner gas nozzle utilized in the formation of the expanded product.

FIG. 3 represents a schematic illustration of the process of the invention whereby a dry meat-like pet food having an expanded texture and appearance is produced. The blended ingredients are introduced into a screw extruder 11 having a heated jacket 12. The ingredients are conveyed and cooked in the extruder and discharged onto a conveyor belt 13. After exiting from extruder barrel 11 and before being discharged onto conveyor 13, the cooked mixture 21 passes through die 32 as illustrated by FIG. 4. Die 22 consists of a pipe 23 having a steam jacket 24 to maintain the temperature of the hot extrudate, and having inlet 26 and outlet 27. Air nozzles 25 are provided within pipe 23 in a position such that air may be injected into the mass of the hot mixture in a manner parallel to the flow of the mixture. Air nozzles 25 are preferably produced from stainless steel and may be connected to a pressure regulator (not shown). Air pressures ranging from 20 to 90 psig are suitable for expansion of the extrudate, along with an air flow rate of about 21 standard cubic feet per minute at 50 psig.

The type of conveyor surface receiving the extrudate depends upon the specific formulation and desired appearance of the final product and is readily determinable by one of ordinary skill in the art. The rate of transport of the extrudate through the screw extruder onto the continuous conveyor immediate to the discharge of the cooker extruder is dependant upon the specific formulation and desired texture and appearance of the final product as well as the specific type of extruder utilized and is felt to be within the skill of the art.

In order to further illustrate the novel aspects of the present invention the following examples are presented.

In the examples, pecentages are by weight based on the weight total of the ingredients used in processing.

EXAMPLE 1

| Ingredient | Percent By Weight |
|---|---|
| Modified soy protein isolate | 19.96 |
| Defatted soy flour | 4.96 |
| Meat and bone meal | 4.96 |
| Sodium caseinate | 4.96 |
| Sucrose | 28.80 |
| Beef trimmings | 4.96 |
| Sorbitol | 9.93 |
| Prime steam lard | 1.99 |
| Dicalcium phosphate dihydrate | 4.86 |
| Potassium chloride | 0.10 |
| Potassium sorbate | 0.09 |
| Trace minerals - vitamin | 0.60 |
| Red No. 40 | 0.02 |
| Violet aluminum lake No. 1 | 0.0022 |
| Water | 12.91 |

A dry pet food having a soft, elastic, meat-like texture and appearance and which contains less than 15 percent moisture having a substantially fibrous texture is produced from the above ingredients in the following manner.

The dry ingredients are added to a 200-lb. Ribbon Mixer and mixed for 1 minute. A 400-lb. Sigma Blade Mixer may be used as well. Color is then added and mixed an additional minute. The wet ingredients are combined in a meat tub, hot water added and mixed by hand allowing for at least partial melting of the fat. This mixture is then poured onto the dry mix in the mixer with the mixer on and blended for 3 minutes. The resulting mix is then hand-fed into a screw extruder. The producton rate under these conditions is between 200–250 lbs. per hour. The temperature within the extruder ranges from a minimum exit temperature of from 235°F. to a maximum of 270°F. Above 270°F. excessive surging of the extrudate from the extruder occurs. The temperature of the extrudate leaving the die is in the 250°–260°F. range. The extrudate is extruded through a die to reduce its diameter and allowed to flow and stretch. The die is placed approximately 18 inches above the conveyor thus allowing time for stretching. The extrudate is immediately cooled to prevent the formed fibers from coalescing.

The extrudate is then discharged onto an air cooled conveyor. Any conveyor system, such as water cooled conveyors, may be utilized within the scope of the present invention. The speed of the belt is adjusted so as to obtain a steady stream of extrudate on the belt. A speed setting of 12 feet per minute is used to produce the product of the present example.

The product is then cooled and cut into bite size pieces. The product has a soft, stringy appearance even after several months. The product is firm, non-sticky and temperature stable. Studies proved the product to be palatable to animals.

EXAMPLE 2

A dry pet food having a soft, elastic, meat-like texture and appearance and which contains less than 15 percent moisture having an expanded texture is produced in the following manner.

Ingredients according to Example 1 are similarly mixed and the resulting mix is hand-fed into a screw extruder. The production rate under these conditions is between 200–250 lbs. per hour. The temperature within the extruder ranges from a minimum exit temperature of from 235°F. to a maximum of 270°F. Above 270°F. excessive surging of the extrudate from the extruder occurs. The temperature of the extrudate leaving the die is in the 250°–260°F. range. To produce the expanded product air is injected into the hot extrudate as it exits from the extruder die. The pressure of said air injected into said hot extrudate is 70–90 psig at a velocity of about 21 standard cubic feet per minute at 20 psig. Maximum expansion of the hot extrudate occurs under these conditions.

The velocity of the injected air as well as the air pressure are dependent upon the amount of expansion desired and can be altered after visually inspecting the expanded extridate in accordance with the desired texture.

The extrudate is then discharged onto an air cooled conveyor. Any conveyor system, such as water cooled conveyors, may be utilized within the scope of the present invention. The speed of the belt is adjusted so as to obtain a steady stream of extrudate on the belt. A speed setting of 12 feet per minute is used to produce the product of the present example.

The product is then cooled and cut into bite size pieces. The product has a soft, sponge-like appearance even after being exposed to air for several months. The product is firm, non-sticky and temperature stable. Studies prove the product to be palatable to animals.

The procedure of Examles 1 and 2 are repeated utilizing the ingredients of Examples 3 through 8 respectively. In each example a product is obtained that resembles meat in appearance and texture and remains so during normal storage.

EXAMPLE 3

| Ingredients | % by Weight |
|---|---|
| Modified soy flour | 45 |
| Meat and bone meal | 5 |
| Sucrose | 15.7 |
| Beef trimmings | 5 |
| Sorbitol | 5 |
| Prime steam lard | 2 |
| Dicalcium phosphate dihydrate | 2.88 |
| KCl | 0.3 |
| NaCl | 0.5 |
| Vitamin, Minerals Premix | 0.6 |
| Red No. 40 | 0.02 |
| Violet aluminum lake No. 1 | 0.002 |
| Oat flour | 5 |
| Water | 13 |

EXAMPLE 4

| Ingredients | % by Weight |
|---|---|
| Defatted soy flour | 4.96 |
| Meat and bone meal | 4.96 |
| Sodium caseinate | 24.86 |
| Sucrose | 28.80 |
| Beef trimmings | 4.96 |
| Sorbitol | 9.92 |
| Prime steam lard | 1.99 |
| Dicalcium phosphate dihydrate | 4.86 |
| Potassium chloride | 0.99 |
| Potassium sorbate | 0.10 |
| Trace minerals - vitamin | 0.60 |
| Red No. 40 | 0.02 |

-continued

| Ingredients | % by Weight |
|---|---|
| Violet aluminum lake No. 1 | 0.0022 |
| Water | 12.91 |

EXAMPLE 5

| Ingredients | % by Weight |
|---|---|
| Modified soy protein isolate | 6.90 |
| Meat and bone meal | 13.10 |
| Defatted soy flour | 16.60 |
| Defluorinated phosphate | 4.10 |
| NaCl | 0.50 |
| KCl | 0.30 |
| Vitamin premix | 0.60 |
| Tallow | 6.00 |
| Propylene glycol | 7.4 |
| Iron oxide | 0.02 |
| FD&C No. 40 | 0.02 |
| Carboxymethylcellulose | 0.40 |
| Sucrose | 25.60 |
| Water | 18.40 |

EXAMPLE 6

| Ingredients | % by Weight |
|---|---|
| Modified soy flour | 60 |
| Meat and bone meal | 5 |
| Sucrose | 5.7 |
| Beef trimmings | 5 |
| Sorbitol | 5 |
| Prime steam lard | 2 |
| Dicalcium phosphate | 2.88 |
| KCl | 0.3 |
| NaCl | 0.5 |
| Vitamin Mineral premix | 0.6 |
| Red No. 40 | 0.02 |
| Violet aluminum lake No. 1 | 0.002 |
| Water | 13 |

EXAMPLE 7

| Ingredients | % by Weight |
|---|---|
| Modified soy flour | 60 |
| Meat and bone meal | 5 |
| Sucrose | 7.7 |
| Beef trimmings | 5 |
| Sorbitol | 3 |
| Prime steam lard | 2 |
| Dicalcium phosphate | 2.88 |
| KCl | 0.3 |
| NaCl | 0.5 |
| Vitamin Mineral premix | 0.6 |
| Red No. 40 | 0.02 |
| Violet aluminum lake No. 1 | 0.002 |
| Water | 13 |

EXAMPLE 8

| Ingredients | % by Weight |
|---|---|
| Modified soy flour | 44 |
| Meat and bone meal | 5 |
| Corn syrup | 22.7 |
| Beef trimmings | 4 |
| Sorbitol | 5 |
| Prime steam lard | 2 |
| Dicalcium phosphate dihydrate | 2.88 |
| KCl | 0.3 |
| NaCl | 0.5 |
| Vitamin mineral Premix | 0.6 |
| Red No. 40 | 0.018 |
| Violet aluminum lake No. 1 | 0.002 |
| Water | 13 |

The dry pet food thus produced will maintain its spongy meat-like texture and appearance during normal storage. If desired, the dry pet food produced in accordance with the invention may be mixed with conventional dry pet foods and marketed in that manner. Such a mixture is possible due to the low moisture content of the pet food.

Obviously modifications of this invention are possible. It is understood, therefore, that this application is intended to cover any variations, uses, or adaptations of the invention as may be considered to be known or customary practice in the art to which the invention pertains.

Having fully described and disclosed the invention, it is claimed:

1. A method for the production of a dry pet food product containing less than 15 percent by weight moisture having a soft, elastic, substantially fibrous meat-like texture and appearance comprising the steps of:

A. blending a dough containing fat, at least one proteinaceous adhesive selected from the group consisting of an alkali modified oil seed vegetable protein, alkali modified wheat gluten, albumen, collagen, sodium caseinate, calcium caseinate, potassium caseinate, magnesium caseinate, and ammonium caseinate, a plasticizing agent with sufficient water to produce a product having less than 15 percent moisture and an additional amount of water sufficient for processing; wherein said proteinaceous adhesive is present in an amount of from about 4 to about 60 percent by weight; and said plasticizing agent is present in an amount of from about 2 to about 40 percent by weight;

B. cooking said dough at a temperature between 200°F. and 300°F. to form a cooked mixture;

C. stretching the cooked mixture to form a fibrous-like mixture; and

D. immediately drying the stretched mixture sufficiently to reduce the moisture content of the stretched mixture to less than 15 percent by weight and coooling the stretched mixture to prevent coalescence of fibers in the fibrous-like mixture.

2. A method according to claim 1 wherein said alkali modified oil seed vegetable protein comprises an alkali modified soy flour.

3. A method according to claim 1 wherein said proteinaceous adhesive is an alkali modified oil seed vegetable protein.

4. A method according to claim 3 wherein said alkali modified oil seed vegetable protein is selected from the group consisting of an alkali modified soy protein isolate, alkali modified soy protein concentrate, alkali modified soy flour, and mixtures thereof.

5. A method according to claim 1 wherein said proteinaceous adhesive comprises an adhesive selected from the group consisting of albumen, collagen, sodium caseinate, calcium caseinate, potassium caseinate, magnesium caseinate, and ammonium caseinate.

6. A method according to claim 1 wherein said plasticizing agent comprises an agent selected from the group consisting of glycerol, sorbitol, 1,3-butanediol, mannitol, propylene glycol, and mixtures thereof.

7. A method according to claim 6 wherein said sorbitol is present in an amount greater than 2 percent by weight but less than 15 percent by weight of the final product.

8. A method according to claim 1 wherein said plasticizing agent comprises an agent selected from the group consisting of corn molasses, corn syrup, and sugar syrup.

9. A method according to claim 1 wherein the processing water is from about 5 parts per hundred to about 15 parts per hundred parts by weight of the product, and the dough is cooked at a temperature between 235° and 270°F.

10. A method according to claim 1 wherein the processing water is less than 5 parts per hundred by weight of the final product, and the dough is cooked at a temperature between 270° and 300°F.

11. A method according to claim 1 wherein the processing water is greater than 15 parts per hundred by weight of the final product, and the dough is cooked at a temperture between 200° and 235°F.

12. A method according to claim 11 further including the step of drying the cooked mixture by conventional means in order to adjust the final product moisture below 15 percent by weight.

13. A method for the production of dry pet food containing less than 15 percent by weight moisture having a soft, elastic, substantially laminated fibrous meat-like texture and appearance comprising the steps of:

A. blending a dough containing fat, at least one proteinaceous adhesive selected from the group consisting of an alkali modified oil seed vegetable protein, alkali modified wheat gluten, albumen, collagen, sodium caseinate, calcium caseinate, potassium caseinate, magnesium caseinate, and ammonium caseinate, a plasticizing agent, with a sufficient amount of water to produce a product having less than 15 percent by weight moisture, and an additional amount of process water; wherein said proteinaceous adhesive is present in an amount of from about 4 to about 60 percent by weight and said plasticizing agent is present in an amount of from about 2 to about 40 percent by weight;

B. heating said mixture at a temperature between 200° and 300°F. for a time sufficient to cook the dough and extruding the cooked dough through a die to form an exrudate;

C. stretching the cooked extrudate to form a fibrous structure, and immediately drying the fibrous structure sufficiently to reduce the moisture content of the fibrous structure to less than 15 percent by weight and cooling said fibrous structure to prevent coalescence of the fibers.

14. A method according to claim 13 wherein the cooked extrudate is stretched by allowing said extrudate to flow out of the extruder die under a gravitational force that results in the stretching.

15. A method according to claim 13 wherein the cooked extrudate is stretched from about 1 to about 10 percent.

16. A method according to claim 13 wherein the cooked extrudate is stretched from about 10 to bout 30 percent.

17. A method according to claim 13 further including the step of subdividing the extrudate to form pieces, and cooling the pieces.

18. A method according to claim 13 wherein said extrudate is cooled by blowing air at it at ambient temperature.

19. A method according to claim 13 wherein said proteinaceous adhesive is an alkali modified protein.

20. A method for the production of a dry pet food product containing less than 15 percent by weight moisture having a soft, elastic, expanded, meat-like texture and appearance comprising the steps of:

A. blending a dough containing fat, a proteinaceous adhesive, a plasticizing agent with sufficient amount of water to produce a product having less than 15 percent moisture and an additional amount of process water; wherein said proteinaceous adhesive is present in an amount of from about 4 to about 60 percent by weight; and said plasticizing agent is present in an amount of from about 2 to about 40 percent by weight;

B. cooking said dough at a temperature between 200° and 300°F.;

C. injecting the cooked mixture with a gas sufficient to provide expansion; and

D. cooling and subdividing the expanded product to form pieces of a dry pet food.

21. A method according to claim 20 wherein said proteinaceous adhesive comprises an alkali modified protein.

22. A method according to claim 20 wherein said proteinaceous adhesive is an alkali modified oil seed vegetable protein.

23. A method according to claim 20 wherein said proteinaceous adhesive is selected from the group consisting of an alkali modified soy protein isolate, alkali modified soy protein concentrate, alkali modified soy flour, alkali modified wheat gluten, and mixtures thereof.

24. A method according to claim 20 wherein said proteinaceous adhesive comprises an adhesive selected from the group consisting of albumen, collagen, sodium caseinate, calcium caseinate, potassium caseinate, magnesium caseinate, and ammonium caseinate.

25. A method according to claim 20 wherein said plasticizing agent comprises an agent selected from the group consisting of glycerol, sorbitol, 1,3-butanediol, mannitol, propylene glycol, and mixtures thereof.

26. A method according to claim 25 wherein said sorbitol is present in an amount greater than 2 percent by weight but less than 15 percent by weight of the final product.

27. A method according to claim 20 wherein said plasticizing agent comprises an agent selected from the group consisting of corn molasses, corn syrup, and sugar syrup.

28. A method according to claim 20 wherein said process water is present in an amount from about 5 parts per hundred to about 15 parts per hundred parts by weight of the product, and the dough is cooked at a temperature between 235° and 270°F.

29. A method according to claim 20 wherein said process water is present in an amount of less than 5 parts per hundred parts by weight of the product, and said dough is cooked at a temperature between 270° and 300°F.

30. A method according to claim 20 wherein said process water is present in an amount greater than 15 parts per hundred parts by weight of the product, and the dough is cooked at a temperature between 200° and 235°F.

31. A method according to claim 20 further including the step of drying the cooked mixture by conventional means in order to adjust the final product moisture below 15 percent by weight.

32. A method for the production of dry pet food containing less than 15 percent by weight moisture having a soft, elastic, expanded, meat-like texture and appearance comprising the steps of:

A. blending a dough containing fat, a proteinaceous adhesive, and a plasticizing agent, with a sufficient amount of water to produce a product having less than 15 percent moisture and an additional amount of process water; wherein said proteinaceous adhesive is present in an amount of from about 4 to about 60 percent by weight and said plasticizing agent is present in an amount of from about 2 to about 40 percent by weight;

B. heating said dough at a temperature between 200° and 300°F. for a time sufficient to cook said ingredients and extruding the cooked mixture through a die;

C. injecting the cooked mixture while in the die with a gas sufficient to form an expanded extrudate; and D. cooling the cooked extrudate.

33. A method according to claim 32 further including the step of subdividing the cooked extrudate into pieces and cooling the pieces after the extrudate has been subdivided.

34. A method according to claim 32 wherein said extrudate is cooled by blowing air at it at ambient temperature.

35. A method according to claim 32 wherein said proteinaceous adhesive comprises an alkali modified protein.

36. A method according to claim 32 wherein said proteinaceous adhesive is an alkali modified oil seed vegetable protein.

37. A method according to claim 32 wherein said proteinaceous adhesive is selected from the group consisting of an alkali modified soy protein isolate, alkali modified soy protein concentrate, alkali modified soy flour, alkali modified wheat gluten, and mixtures thereof.

* * * * *